(12) United States Patent
Vollmer et al.

(10) Patent No.: US 6,781,997 B1
(45) Date of Patent: Aug. 24, 2004

(54) METHOD OF ALLOCATING TRANSMISSION RESOURCES IN A CENTRALLY CONTROLLED COMMUNICATION SYSTEM

(75) Inventors: Vasco Vollmer, Gartow (DE); Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 701 days.

(21) Appl. No.: 09/605,353

(22) Filed: Jun. 28, 2000

(30) Foreign Application Priority Data

Jun. 28, 1999 (DE) .......................................... 199 29 385

(51) Int. Cl.[7] .............................................. H04L 12/28
(52) U.S. Cl. ................... 370/395.41; 370/468
(58) Field of Search ................................ 370/314, 398, 370/395.21, 395.4, 395.41, 395.62, 458, 468, 503–511

(56) References Cited

U.S. PATENT DOCUMENTS 5,355,375 A * 10/1994 Christensen ................ 370/407

FOREIGN PATENT DOCUMENTS

DE 197 26 120 A1 12/1998

OTHER PUBLICATIONS

D. Petras, A. Kraemling: "MAC Protocol with Polling and Fast . . . " IEEE ATM Workshop, San Francisco, Ca., Aug. 1996.

D. Petras, et al.: "MAC Protocol for wireless ATM . . . " PIMRC' 96, Taipei. Taiwan, Oct. 1996.

\* cited by examiner

Primary Examiner—Wellington Chin
Assistant Examiner—Brenda Pham
(74) Attorney, Agent, or Firm—Michael J. Striker

(57) ABSTRACT

A method of allocating transmission resources to respective terminals in a centrally controlled communication system in which the transmission resource allocation to the terminal is performed by a central unit includes allocating the transmission resources for at least one frame-oriented connection of a deterministic kind, particularly such that operates with a substantially constant data rate, independently of any previously issued resource requests for non-deterministic connections; providing a special designation for such a deterministic connection to distinguish the same from other connections; and correcting non-synchronous timing between the central unit and the affected terminals particularly for such a deterministic connection.

13 Claims, 3 Drawing Sheets

| FRAME 1: | BC-P | T1 | T1 | T2 | T3 | | RA-P |
|---|---|---|---|---|---|---|---|
| FRAME 2: | BC-P | EMPTY | T2 | T3 | | | RA-P |
| FRAME 3: | BC-P | EMPTY | | T2 | T3 | | RA-P |
| FRAME 4: | BC-P | T1 | T1 | T2 | T3 | | RA-P |
| FRAME 5: | BC-P | T3 | | | T2 | EMPTY | RA-P |
| FRAME 6: | BC-P | T3 | | T2 | EMPTY | | RA-P |
| FRAME 7: | BC-P | T1 | T1 | T2 | EMPTY | | RA-P |
Fig.7
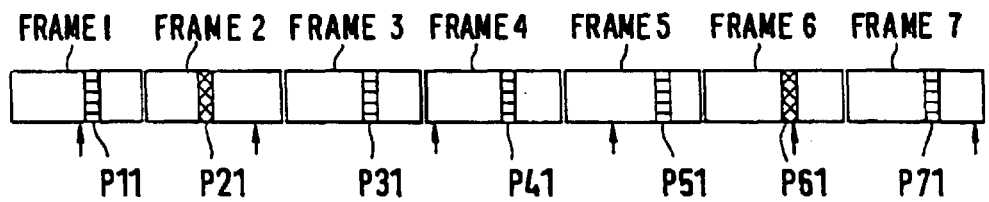
Fig.8
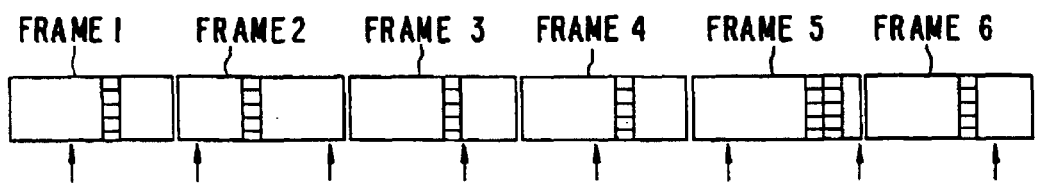
Fig.9
| FRAME 1: | BC-P | T1 | T1 | T2 | T3 | | | RA-P |
|---|---|---|---|---|---|---|---|---|
| FRAME 2: | BC-P | T2 | | T3 | | | | RA-P |
| FRAME 3: | BC-P | T3 | | | | T2 | T2 | RA-P |
| FRAME 4: | BC P | T1 | T1 | T3 | | | T2 | RA-P |
| FRAME 5: | BC-P | T3 | | | | | T2 | RA-P |
| FRAME 6: | BC-P | T2 | | T3 | | | | RA-P |
| FRAME 7: | BC-P | T2 | T1 | T1 | T3 | | | RA-P |
Fig.10

METHOD OF ALLOCATING TRANSMISSION RESOURCES IN A CENTRALLY CONTROLLED COMMUNICATION SYSTEM

BACKGROUND OF THE INVENTION

1. Field of the Invention

The present invention relates to data transmission in general, and more particularly to a method of allocating transmission resources in an asynchronous transfer mode communications system.

2. Description of the Related Art

There are already known various constructions of telecommunications systems, among them such which employ a so-called asynchronous transfer mode in operation. Systems of the latter type typically include a central unit and a plurality of separate terminals that communicate either with the central unit or with one another, but always under the control of the central unit. This control is necessary in such an asynchronous system, in that the central unit has to allocate transmission resources (also known as time slots) for contents transmission to the individual terminals so that they would operate sequentially rather than simultaneously. The communication may take place, for instance, through the airwaves (radio transmission), and the terminals may include, for instance, radio telephones, computers or other similar communications devices. However, at least some of such terminals could be connected to the central unit (or to one another as well) by different media, such as through electrical, optical or other cables. Be it as it may, the central unit always has to coordinate the operation (timely transmission) of these terminals.

In the heretofore proposed arrangements (and associated methods) of this kind, the individual terminals inform the central unit about the status of their buffers, especially the filling status of their output and input buffers, and the central unit allocates the transmission resources to such terminals on the basis of this information. The allocation of the transmission capacity in a communication system of this kind is revealed, for instance, in the German patent application 197 26 120.5, in the article by D. Petras and A. Krämling "MAC Protocol with Polling and Fast Collision Resolution fir an ATM Air Interface", IEEE ATM Workshop, San Francisco, Calif., August 1996, or in the article by D. Petras, A. Krämling and A. Hettich "MAC Protocol for Wireless ATM: Contention Free versus Contention Based Transmission of Reservation Requests", PIMRC '96 Taipei, Taiwan, October 1996.

In these and similar applications, a MAC (Medium Access Control) channel capture protocol is typically used. For the terminal to request the resources. It transmits a so-called resource request (RR) data string, in which it informs the central unit about its needs. These RR data strings are valid for an individual DLC (Data Link Control) connection, and include the information about the number of the data strings or packets that are waiting in the buffers of the respective terminal for transmission. In this respect, it is important to realize that the number of such waiting data packets that are temporarily stored in the respective buffer may greatly exceed the transmission capacity of a single MAC transmission frame. The central unit allocates the capacities of the individual phases of a MAC transmission frame, in turn, on the basis of the individual DLC connections. For the downlink phase (i.e. central unit to terminals), the central unit announces which one of the terminals is to receive which information. For the uplink phase (terminal to central unit), it is announced which one of the terminals is permitted to send for a DLC connection at a particular time. For the Direct Mode Channel (direct communication between the terminals), the sender and receiver and the DLC connection are announced.

In this respect, it is to be borne in mind that the RR data ought to indicate the actual filling status of the buffer under all circumstances. In order to have the transmission capacity allocated to the respective terminal by the central unit on the basis of the filling status, it is not advisable for the respective terminal to report to the central unit anything else but the actual filling status of its buffer, inasmuch as the urgency of the transmission could otherwise by judged erroneously under certain circumstances, were it otherwise.

The mechanisms for requesting and allocating the transmission resources that have been mentioned above are particularly, but not exclusively, suited for the burst-type, i.e. statistics-based, telecommunication traffic. However, there is also another type of data transmission (referred to herein as deterministic) which is more or less constant, i.e. the amount of data transmitted per unit of time does not vary to any great extent, if at all. The possibly most widespread example of such a deterministic traffic, which is also often referred to as CBR (Constant Bit Rate) traffic, is certainly voice communication without compression, in which, generally speaking, 64 Kbit/s are generated with great uniformity. These data are then buffered at the transmitter until, for instance, an ATM cell is filled. These full ATM cells are then periodically transmitted into the communications system.

In the course of ATM signalization, the parameter data rate, intermediate arrival time and the maximum variation (jitter) in the intermediate arrival time are transmitted in the course of initially establishing the connection.

OBJECTS OF THE INVENTION

Accordingly, it is a general object of the present invention to avoid the disadvantages of the prior art.

More particularly, it is an object of the present invention to provide a method of allocating transmission resources in a centrally controlled communications system that does not possess the drawbacks of the known methods of this type.

Still another object of the present invention is to devise a method of the type here under consideration which would be particularly suited for use in conjunction with transmitting, besides statistical traffic, also deterministic traffic.

It is yet another object of the present invention to design the above method in such a manner as to be able to simplify the exchange of control information between the central unit and the terminals communicating with it.

A concomitant object of the present invention is so to construct the equipment for performing the method of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a method of allocating transmission resources to respective terminals in a centrally controlled communication system in which the transmission resource allocation to the terminal is performed by a central unit; this method includes allocating the transmission resources for at least one frame-oriented connection of a deterministic kind, particularly such that operates with a substantially constant data rate, independently of any previously issued resource requests for non-deterministic connections; providing a special designation for such a deterministic connection to distinguish the same from other connections; and correcting non-synchronous timing between the central unit and the affected terminals particularly for such a deterministic connection.

A particular advantage of the method as described so far is that it renders it possible to optimize the allocation of the transmission resources, especially when connection with substantially constant data transmission rate are present in the system. In accordance with the present invention, the otherwise existing need for explicit resource requests issued by the terminals operating with the constant data transmission rate can be dispensed with, In this manner, the processing in the central unit is simplified, and the resource capacity is saved.

The present invention is advantageously particularly suited for use in such communications systems, in which in addition to the data-burst traffic, there is also encountered deterministic traffic, that is traffic in which particularly the data amount per unit of time (data rate) is substantially constant, or in which the intermediate arrival time between the successive data packets is substantially constant. In the ATM (Asynchronous Transfer Mode) transmission scheme, this type of traffic or communication is often referred to as a Constant Bit Rate (CBR) traffic. However, the present invention can also be used in different environments, that is, independently of ATM, for all deterministic kinds of traffic.

In heretofore proposed or constructed systems, for instance in the actual concept employed in the Hyperlan Type 2 communication system, transmission resources are allocated by the central unit only when they have been specifically previously requested by the respective terminal. Yet, the additional information that is available to the central unit about such CBR connections is not utilized. In contradistinction to this, the present invention utilizes this additional information in order to optimize the process of resource allocation. Even though, in accordance with the present invention, the transmission resource allocation for the connections with the generally constant data rate is accomplished without any prior request to the central unit for such allocation, the central unit nevertheless allocates the requisite transmission resources to the affected terminals in amounts resulting from, in each instance, the applicable data rate as it became known during the initial establishment of the respective deterministic connection with the respective terminal, or the intermediate arrival time of the data packets (cells). Simultaneously, corrections are made to eliminate the effect of non-synchronous operation of the respective terminals relative to the central unit and/or one another.

Advantageously, the allocating step includes transmitting a connection characteristic for the deterministic connection in the course of the establishment of this connection, and setting the resource allocation for the respective terminal on the basis of this connection characteristic. The allocating step advantageously includes indicating a data rate for the deterministic connection in the course of establishment of this connection. This indicating step may include expressing the data rate as a number of data packets of constant length that are to be transmitted within a predetermined number of frames, or as a data capacity to be transmitted within a predetermined time interval.

According to another aspect of the present invention, the correcting step includes inserting filler packets devoid of useful information into the respective frame when the actual data packets are too slow in arriving. On the other hand, the correcting step includes issuing resource requests for additional allocation when the actual data packets arrive at too rapid a pace. The correcting step advantageously further includes granting such resource requests for the deterministic connection independently of any other transmission resource requests.

Another facet of the present invention is to be seen in the fact that the inventive method comprises the step of performing the allocating, providing and correcting steps during an uplink phase as the respective terminal is to transmit information to at least one of the central unit and another terminal. This method may advantageously further include the step of additionally allocating the resources remaining after the performance of the allocating step to any connection of a non-deterministic nature in dependence on the buffer filling status encountered at the respective terminal associated with this particular non-deterministic connection. The allocating step advantageously includes transmitting and evaluating respective data rate, intermediate arrival time of data packets, and maximum deviation of the data packet arrival rate parameters in establishing the non-deterministic connection characteristic. Last but not least, it is advantageous the allocating step includes utilizing additional information that is available for the respective deterministic connection at the central unit, such as the expected arrival of the next following data packet, for the optimization of the resource allocations.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 7 is a diagrammatic view showing the allocation of data packets from several terminals corresponding to those of FIGS. 5 and 6 within a plurality of frames;

FIG. 8 is a diagrammatic view depicting the time intervals of arrival of data packets at one of the terminals;

FIG. 9 is a view akin to that of FIG. 6 but this time for a situation in which the data packets are arriving at one of the terminals in too rapid a succession; and FIG. 10 is a view similar to that of FIG. 7 but relating to the situation revealed in FIGS. 5 and 9.

DETAILED DESCRIPTION OF THE PREFERRED EMBODIMENT

Figure 1:
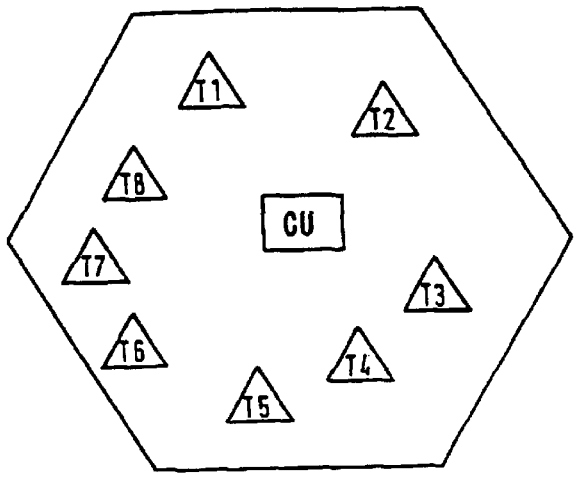
FIG. 1 is a diagrammatic view of an example of a communication system suitable for the employment of the present invention therein.

Referring now to the drawing in detail, and first to FIG. 1 thereof, it may be seen that it illustrates, in a simplified, diagrammatic fashion, a communication system that includes a central unit CU and a multitude of (as shown, eight) terminals identified as $T_1$ to $T_8$. As already mentioned before, this communication system as such could be used in a traditional manner; however, it is also suited for operating or being operated in accordance with the present invention. In any event, the central unit CU and the terminals such as $T_1$ to $T_8$ are capable of communicating (i.e. exchanging information, typically in the form of digital data) with one another, always under the control of the central unit CU, whether this communication is between the central unit CU and the respective one of the terminals such as $T_1$ to $T_8$, or directly (i.e. without going through the central unit CU) between the respective ones of the terminals such as $T_1$ to $T_8$.

To simplify the following description, certain assumptions will be made as to exactly how this communication and/or data exchange is accomplished; however, it is to be understood that this particular approach to data transmission is not intended to be exhaustive and that the present invention can also be gainfully employed in communication systems of a different nature. One of such assumptions is that the above communication system is designed for generally operating in a so-called asynchronous transfer mode (ATM), in which the "contents" data (i.e. that carrying the actual information to be exchanged as distinguished from the "control" data that carries information needed to control the operation of the system including the transmission and reception of the contents data) does not have a pre-assigned time slot within a so-called transmission frame; rather, the central unit CU assigns itself as well as to the respective terminals such as $T_1$ to $T_8$ respective transmission time intervals the durations of which as well as locations within the respective frames, generally speaking, may (and in ATM as currently practiced do) vary from one frame to another in dependence on the amount of information (contents data) that is waiting to be transmitted at that particular time.

Figure 2:
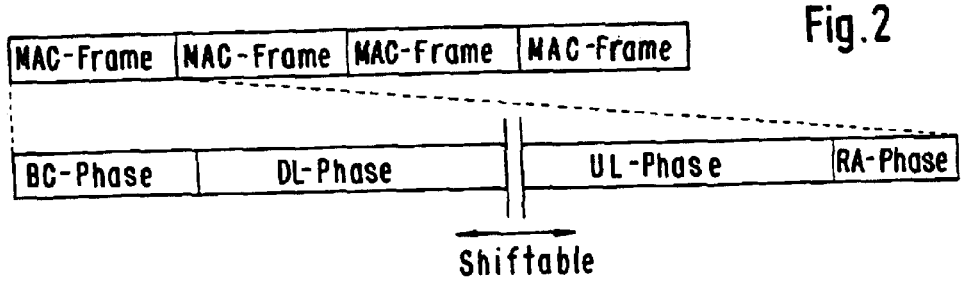
FIG. 2 is a diagrammatic view representing a MAC frame and its contents.

At this time, still prior to the presentation of the description of the present invention proper, the composition or structure of the transmission frames, particularly as it is encountered in the context of a so-called medium access control (MAC) channel capture protocol, will be discussed in some detail in conjunction particularly with FIG. 2 of the drawing in order to enhance or improve the understanding of the present invention. The communication mentioned above takes place by means of individual MAC frames all of the same duration. Each of these MAC frames is, in turn, subdivided into a broadcast phase BC, a downlink phase DL, an uplink phase UL, and a random access phase RA. In the course of the broadcast phase BC, the central unit CU transmits information that is relevant for all of the terminals $T_1$, $T_2$ . . . , for instance the name and/or address of the central unit CU, announcement of transmissions in downlink and uplink, and the position of the random access phase RA. During the downlink phase DL, the central unit CU sends data to the individual terminals $T_1$, $T_2$ . . . , while the individual terminals $T_1$, $T_2$ . . . send data to the central unit CU during the uplink phase UL. During the random access phase RA, those of the terminals $T_1$, $T_2$ . . . that have not been assigned any transmission capacity during the uplink phase UL can send information to the central unit CU. However, inasmuch those of the terminals $T_1$, $T_2$ . . . that are active during the random access phase RA insert themselves into the transmission scheme in an uncoordinated manner, collisions may take place.

Figure 3:
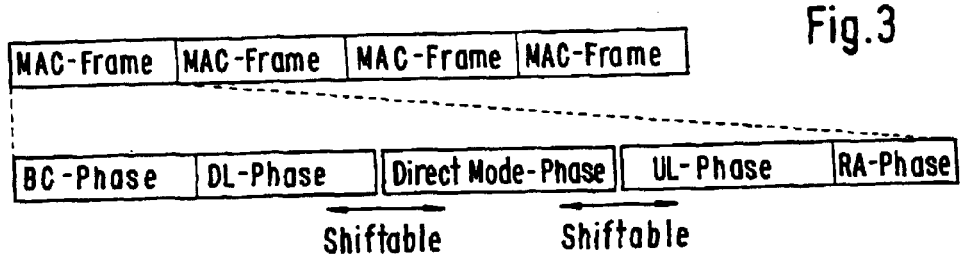
FIG. 3 is a view similar to that of FIG. 1 but with the contents including a direct mode phase.

FIG. 3 of the drawing illustrates the incorporation into the respective MAC frames of another phase that allows the direct communication of the terminals $T_1$, $T_2$ . . . with one another. This additional phase is commonly referred to as the direct mode phase. The format of the MAC frame that results under these circumstances is presented in FIG. 3 of the drawing. In this context, it is to be mentioned that the exact succession of the various phases is not material.

Figure 4:
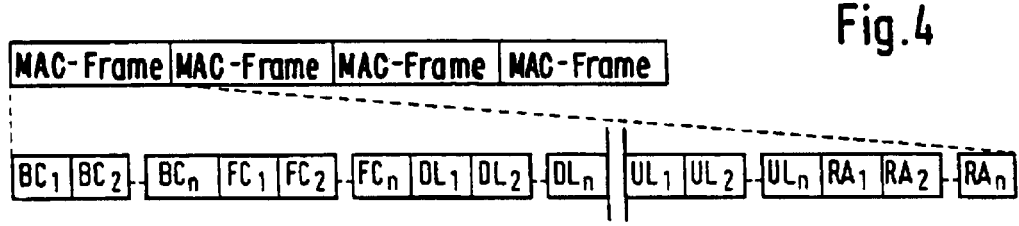
FIG. 4 is another diagrammatic view of a MAC frame, this time for use with sectioned antennas.

When sectioned antennas are being used for radio transmissions, exactly one broadcast phase BC and none or a single additional phase is presented per MAC frame to the respective sector FC. This is illustrated in FIG. 4 of the drawing. Herein, the subscripts relate to the sectors FC, which means that $FC_1$ relates to the first of the antenna sectors FC, $FC_2$ to the second, and $FC_n$ to the n-th. Herein, the broadcast phase BC of FIG. 2 is subdivided into two sub-phases, one still being designated as BC, while the other bears the designation FC, these two sub-phases appearing in the respective MAC frame in a time-separated manner.

The method of the present invention basically resides in that a constant-type traffic designated as CBR (constant bit rate), that is traffic that produces data packets at regular time intervals, is being serviced (allowed to proceed) without the prior submission of a request for the allocation of resources. This is in stark contrast to current operation, where no transmission of contents data, be it between the central unit CU and any one of the terminals $T_1$, $T_2$ . . . or between the respective ones of the terminals $T_1$, $T_2$ . . . , takes place unless the central unit CU has allocated time for it in the respective frame in response to a specific prior request for such a transmission originating at the respective terminal $T_1$, $T_2$ . . . . To achieve this different treatment of CBR traffic from other traffic, information regarding the special character of this CBR traffic is transmitted during the time that the transmission is being established. Namely, during this connection or transmission established time, the location initiating the connection, be it the respective one of the terminals $T_1$, $T_2$ . . . or the central unit CU, designates the connection being established as CBR traffic. In addition to that, there is also transmitted the information concerning the rate at which data is to be transferred through this connection. The data transfer rate is advantageously given as the number of the data packets (of constant length) that are to be transferred within a certain number of data frames, as such:

$$\text{data rate} = x \text{ packets}/n \text{ frames.}$$

This data rate is then taken into consideration by the central unit CU during the distribution of the transmission resources among the various activities, and the corresponding amount of transmission capacity is allocated by the central unit CU in the respective correct frame. If the CBR information is to be transmitted during the uplink phase UL, this allocated capacity or time is then used by the respective one of the terminals $T_1$, $T_2$ . . . to send the previously arriving, temporarily stored, packets correspondingly. If, on the other hand, it is to be.transmitted during the downlink phase DL, then the central unit CU sends this information, depending on the filling status of the sending storage (buffer status), correspondingly, following a previous announcement during the broadcast phase BC.

Owing to variations within the signal path, for instance due to non-synchronous operation of system clocks in the central unit CU and in the various terminals $T_1$, $T_2$ . . . , it can happen that a particular data packet is not available at the right time, or that the resource allocations occur too slowly. When this happens for transmission during the downlink phase DL, then the central unit CU simply announces the transmission of a correspondingly smaller number of data packets. In this respect, the behavior is not any different from that encountered during other traffic.

However, two different situations that must be taken care of can arise when this data packet arrival delay occurs as the data is to be transmitted in the uplink phase UL:

one, more than one, or all data packets arrive more slowly than what had been negotiated during the establishment of the connection. In this case, the respective one of the terminals transmits, instead of the planned data packet, a filling (or dummy) data packet which does not contain any useful data. However, this dummy data packet bears a special designation and is thus immediately discarded on arrival at the respective receiver or destination. The responsibility for the generation and discarding of such packets preferably resides in the security layer (layer 2 of the OSI reference model); however, it may also reside, instead, in a higher layer; or one, more than one, or all data packets arrive in a more rapid succession than what had been negotiated during the establishment of the connection. In this case, the available transmission capacity is insufficient. Consequently, the respective one of the terminals $T_1$, $T_2$ ... requests from the central unit CU the allocation of, for instance, one additional packet for the transmission of the too rapidly arriving data, by sending a corresponding resource request to the central unit CU. What is important in this regard is that both the respective one of the terminals $T_1$, $T_2$ ... and the central unit CU know, owing to the information exchanged during the connection establishment operation, that the established connection is a CBR connection. This results in a situation in which the corresponding resource requests are being handled differently than those for other types of connections or transmissions, and this is known both to the respective one of the terminals $T_1$, $T_2$ ... and the central unit CU. This means that a resource request associated with a CBR connection leads to resource allocations that are granted by the central unit CU in addition to the resource allocations that have already been made available on a regular basis. This also means that the resource request for this CBR connection does not indicate the buffer status of the respective one of the terminals $T_1$, $T_2$ ... as it would if the connection were a non-CBR one; rather, it describes the additional need for the CBR connection in question.

Figure 5:
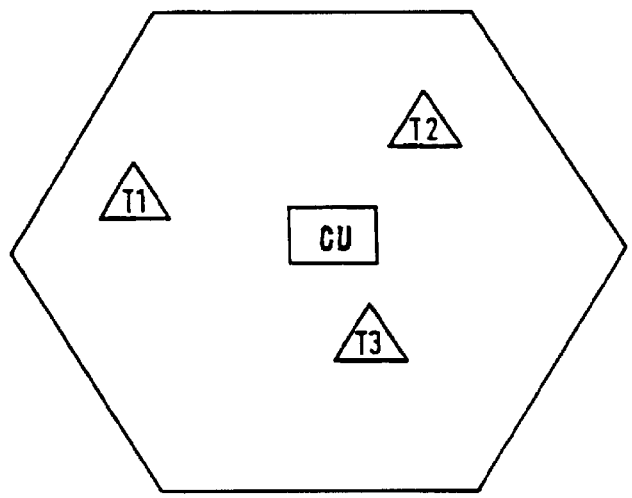
FIG. 5 is a view similar to that of FIG. 1 but simplified relative thereto by including merely three terminals in addition to a central unit.

An exemplary implementation depicted in FIG. 5 is simplified relative to that of FIG. 1 in that merely three terminals $T_1$, $T_2$ and $T_3$ are present (or presently active) in the respective radio cell besides the central unit CU. In this example, the terminal $T_1$ opens a CBR connection with the parameter of four data packets per three frames; this means that the terminal $T_1$ expects to receive the resource allocation for the transmission of two packets in each third frame. Moreover, the terminal $T_2$ has asked for and expects to receive a CBR connection with about one data packet per data frame. The terminal $T_3$, on the other hand, has a connection that is not of a constant character and asks for the allocation of those resources (transmission times) that are not already otherwise taken. The terminal $T_3$, incidentally, requests the allocation of the requisite amount of resources for each frame anew. In contradistinction, the requisite resources are automatically allocated to the terminals $T_1$, and $T_2$.

Figure 6:
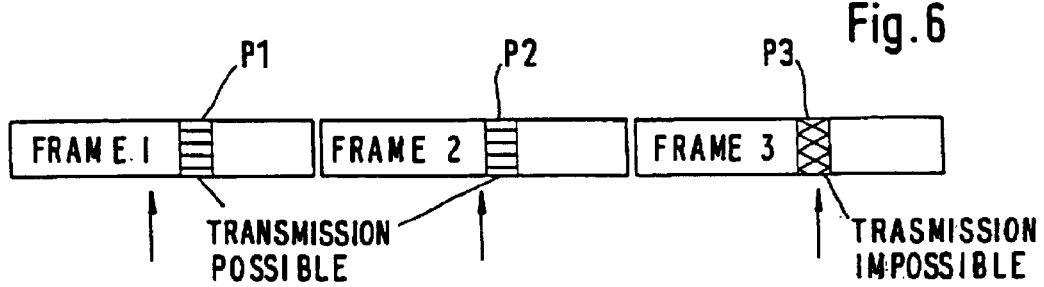
FIG. 6 a diagrammatic view showing the composition of a transmission frame in a situation where data packets are arriving too slowly at one of the terminals corresponding to those revealed in FIG. 5.

Now, it so happens that the timings of the terminal $T_2$ and the central unit CU are not precisely synchronous in the example given, which results in a situation in which the data packets to be transmitted by the terminal $T_2$ arrive at the output of the latter at a slightly slower pace than that at which the central unit allocates transmission resources to the terminal $T_2$. This operation or situation is indicated in FIG. 6 of the drawing. The positions (time intervals) $P_1$, $P_2$ and $P_3$ are those allocated by the central unit to the terminal $T_2$ for data transmission. On the other hand, the vertical arrows indicate the times of arrival of the respective data packets at the output of the terminal $T_2$. As may be observed in FIG. 6, data transmission is possible in the respective positions $P_1$ and $P_2$, but not in the position $P_3$. Now, it is to be borne in mind that no agreement had been made during the initial connection establishment operation resulting in the selection of the appropriate data transmission rate about the exact position of the allocated resources within the respective data frame, so that the central unit CU may, in principle, place the respective positions $P_1$, $P_2$ and $P_3$ at arbitrary locations within the respective data frames. Herein, the following exemplary frame structure depicted in FIG. 7 of the drawing results during the operation (downlink phase DL and direct mode phase are not considered here because they are irrelevant in this context):

In frame 1, following the broadcast phase BC, two packets are allocated to the terminal $T_1$, and one to the terminal $T_2$. The remainder, all the way to the random access phase RA, is made available to the terminal $T_3$.

In frame 2, the beginning remains empty, the terminal $T_2$ is allocated a single packet, and the rest is once more made available to the terminal $T_3$. Yet, the terminal $T_2$ does not have the requisite data to be transmitted available to it yet (the corresponding field is hatched) and, therefore, the terminal $T_2$ sends a filling or dummy packet in the allocated time slot or position. This mismatch may be the result of variations in the generation of the data to be transmitted or, as shown here, of a change in the temporal position of the allocated transmission time slot in the respective frame. When this occurs, and the variation is regular, it is to be expected that the offset of the time of arrival of the data packet will gradually change until this arrival time is once more at the vicinity of the position allocated to the transmission of a packet from the terminal $T_2$. This is illustrated by way of an example in FIG. 9 of the drawing, wherein the difference in timing between the affected terminal such as $T_2$ and the central unit CU has been intentionally chosen to be considerable.

In frame 3, the beginning remains once more free or empty, and then follows the resource allocation to the terminal $T_2$. Inasmuch as the late-arriving data packet could not have been transmitted in the frame 2, the terminal $T_2$ now sends this data packet that had arrived during the frame 2.

In frame 4, the terminal $T_1$ obtains the requisite two data packets allocated to it again, whereas the terminal $T_2$ has a single packet assigned to it.

In frame 5, the terminal $T_3$ obtains its resource allocation first, then the terminal $T_2$. The remainder of the frame is empty.

As a result of the timing mismatch, the data packet has once more arrived too late in frame 6, so that the terminal $T_2$ transmits a dummy packet again in the allocated time slot. The data packet that had arrived at the output of the terminal $T_2$ in the course of this frame will then be transmitted during the frame 7.

Examples of data packet arrival times, and the transmission opportunities being made available (allocation of transmission resources) for the terminal $T_2$ are illustrated for this first example in FIG. 8 of the drawing. The positions (time slots) $P_{11}$, to $P_{71}$ indicate the positions allocated by the central unit CU for the transmission from the terminal $T_2$. The vertical arrows once more indicate the times of arrival of the respective data packets at the output of the terminal $T_2$. While transmission is possible in the positions $P_{11}$, $P_{31}$, $P_{41}$, $P_{51}$ and $P_{71}$, it is impossible in the positions $P_{21}$ and $P_{61}$.

In a second example, the situation is similar to that discussed above as far as the arrangement of the terminals $T_1$, $T_2$ and $T_3$, and of the central unit CU, and the established connection, are concerned. However, there is an important difference: this time the data is arriving at the output of the terminal $T_2$, albeit still regularly, at a too rapid a pace. Therefore, the terminal $T_2$ need not insert any dummy packets; rather, it needs to request additional transmission resource allocations from the central unit CU. This is revealed in FIG. 9 of the drawing. As a result of the too rapid an arrival of the data packets at the output of the terminal $T_2$, it occurs in frame 4 that tow data packets instead of just one are now present in the output buffer. Therefore, the terminal $T_2$ transmits to the central unit CU, in addition to the transmission of the first stored packet, a resource request, in which it specifies the required transmission resources (transmission capacity). The central unit CU continues to allocate those transmission resources that have been negotiated during the initial establishment of the connection, and adds to it, in frame 5, additional sending opportunity (transmission time slot), on the basis of the resource request issued by the terminal $T_2$ in frame 4.

In a third example of operation, the situation is similar to those described above in conjunction with the first and second examples, except that:

the terminal $T_2$ now exhibits a slight timing offset, and additionally the packets arrive with a slight irregularity; and the central unit CU now does not choose the position of the resource allocation arbitrarily any more, but rather takes the situation existing at the terminal $T_2$ into consideration.

What results is the packet allocation that is visible in FIG. 10 of the drawing:

In frame 1, following the broadcast phase BC, two data packets are allocated to the terminal $T_1$, while one packet is assigned to the terminal $T_2$ and the rest of the time remaining prior to the random access phase RA is made available to the terminal $T_3$.

In frame 2, one packet is allocated to the terminal $T_2$, and the terminal $T_3$ once more receives the rest. However, the terminal $T_2$ has not yet received any transmission-ready data at its output (the field is hatched). This mismatch may be the result of variations in the generation of the data to be transmitted or, as shown here, of a change in the temporal position of the allocated transmission time slot in the respective frame. When this happens, the terminal $T_2$ requests, via a normal resource request RR that it transmits at the same time as the dummy packet, an additional sending opportunity from the central unit CU (here one packet). This requested packet is then allocated by the central unit CU in frame 3 in addition to the regular packet. In addition, the central unit CU notices that the terminal $T_2$ did not have the requisite data available to it in the previous frame at the right time for transmission, and shifts the temporal position of the transmission for this terminal $T_2$ toward the rear in the frame.

In frame 4, the terminal $T_1$ once more has its two packets allocated to it. The terminal $T_2$ finds its allocation for the transmission of its data packet once more at the end of the frame.

In frame 5, the data to be transmitted is not available at the output of the terminal $T_2$ at the right time (field hatched). Therefore, the terminal $T_2$ requests the allocation of additional transmission resources for this packet.

In frame 6, an additional time slot is allocated to the terminal $T_2$ for the transmission of this delayed data, and the automatic allocation is again transferred for frame 7, this time to its beginning.

The transmission medium for the examples given above may be respective radio transmission paths, or sections of a passive optical fiber net, or sections of a hybrid optical fiber/coaxial cable net.

The determination of the CBR rate during the establishment of the connection need not necessarily be related to the number of the packets with respect to a certain number of the frames. Rather, it is also possible to express the requirement in bits per second, or even any different requirement which makes it possible to settle on a given data transmission capacity (data transmission rate within a predetermined time period). In this case, the central unit CU may advantageously convert this requirement into a value that can be expressed in terms of x packets per n frames.

It will be understood that each of the elements described above, or two or more together, may also find a useful application in other types of constructions differing from the type described above.

While the present invention has been described and illustrated herein as embodied in specific construction of a data transmission system, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A method of allocating transmission resources to respective terminals in a centrally controlled communication system in which the transmission resource allocation to the terminal is performed by a central unit, comprising the steps of allocating the transmission resources for at least one frame-oriented connection of a deterministic kind, so as to operate with a substantially constant data rate, independently of any previously issued resource requests for non-deterministic connections;

providing a special designation for such a deterministic connection to distinguish the same from other connections; and correcting non-synchronous timing between the central unit and the affected terminals particularly for such a deterministic connection.

2. The method as defined in claim 1, wherein said allocating step includes transmitting a connection characteristic for the deterministic connection in the course of the establishment of this connection, and setting the resource allocation for the respective terminal on the basis of this connection characteristic.

3. The method as defined in claim 1, wherein said allocating step includes indicating a data rate for the deterministic connection in the course of establishment of this connection.

4. The method as defined in claim 3, wherein said indicating step includes expressing the data rate as a number of data packets of constant length that are to be transmitted within number of frames.

5. The method as defined in claim 3, wherein said indicating step includes expressing the data rate as a data capacity to be transmitted within a predetermined time interval.

6. The method as defined in claim 1, wherein said correcting step includes inserting filler packets devoid of useful information into the respective frame when the actual data packets are too slow in arriving.

7. The method as defined in claim 1, wherein said correcting step includes issuing resource requests for additional allocation when the actual data packets arrive at too rapid a pace.

8. The method as defined in claim 7, wherein said correcting step further includes granting such resource requests for the deterministic connection independently of any other transmission resource request.

9. The method a defined in claim 1, and further comprising the step of performing said allocating, providing and correcting steps during an uplink phase as the respective terminal is to transmit information to at least one of the central unit and another terminal.

10. The method as defined in claim 1, and further comprising the step of additionally allocating the resources remaining after the performance of said allocating step to any connection of a non-deterministic nature in dependence on the buffer filling status encountered at the respective terminal associated with this particular non-deterministic connection.

11. The method as defined in claim 1, wherein said allocating step includes transmitting and evaluating respective data rate, intermediate arrival time of data packets, and maximum deviation of the data packet arrival rate parameters in establishing the non-deterministic connection characteristic.

12. The method as defined in claim 1, wherein said allocating step includes utilizing additional information that is available for the respective deterministic connection at the central unit, for the optimization of the resource allocations.

13. The method as defined in claim 1, wherein said allocating step includes utilizing additional information that is available for the respective deterministic connection at the central unit with the expected arrival of the next following data packet, for the optimization of the resource allocations.

* * * * *